L. W. BUGBEE.
MACHINE FOR MAKING SPOTTING WHEELS FOR MANUFACTURING LENSES.
APPLICATION FILED FEB. 18, 1919.
1,333,383.
Patented Mar. 9, 1920.
3 SHEETS—SHEET 1.
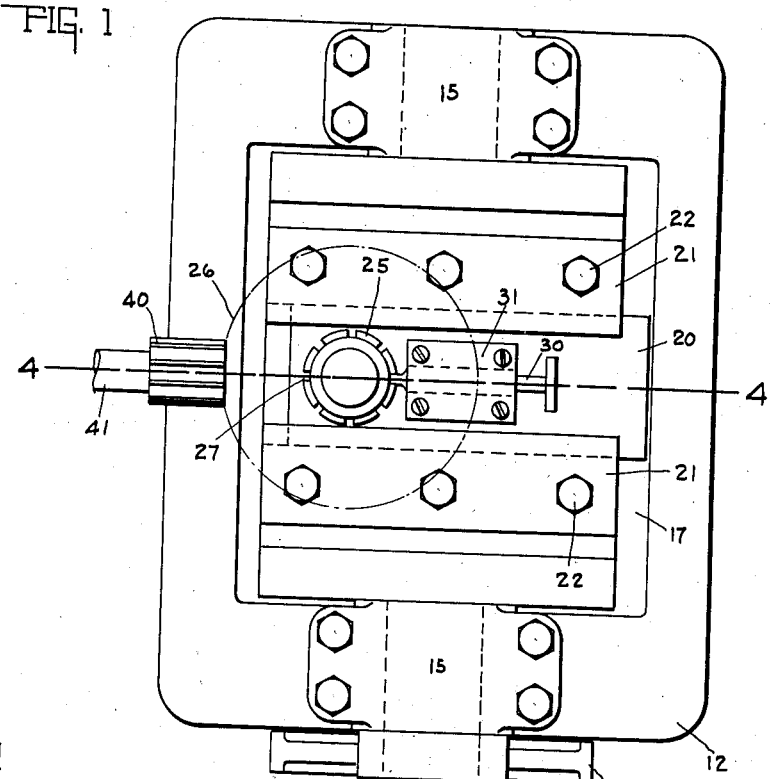
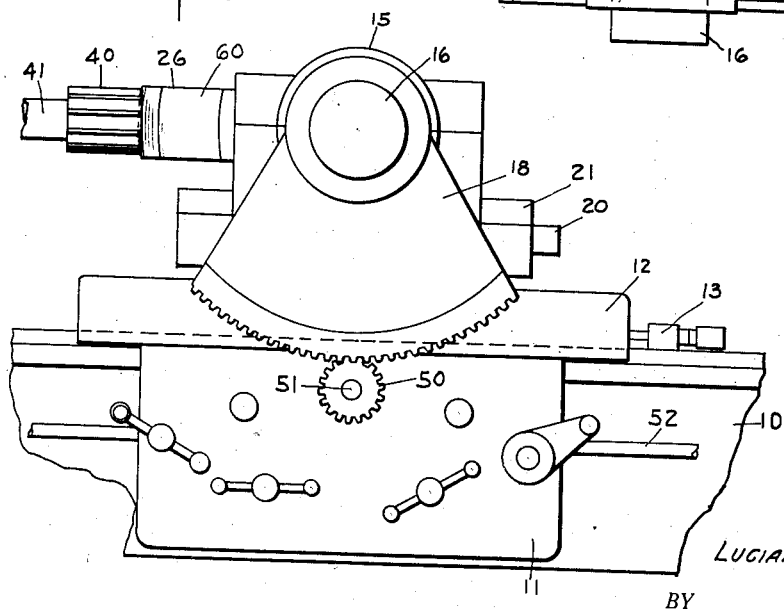
INVENTOR.
LUCIAN W. BUGBEE.
BY
Lockwood & Lockwood
ATTORNEYS L. W. BUGBEE.
MACHINE FOR MAKING SPOTTING WHEELS FOR MANUFACTURING LENSES.
APPLICATION FILED FEB. 18, 1919.
1,333,383.
Patented Mar. 9, 1920.
3 SHEETS—SHEET 2.
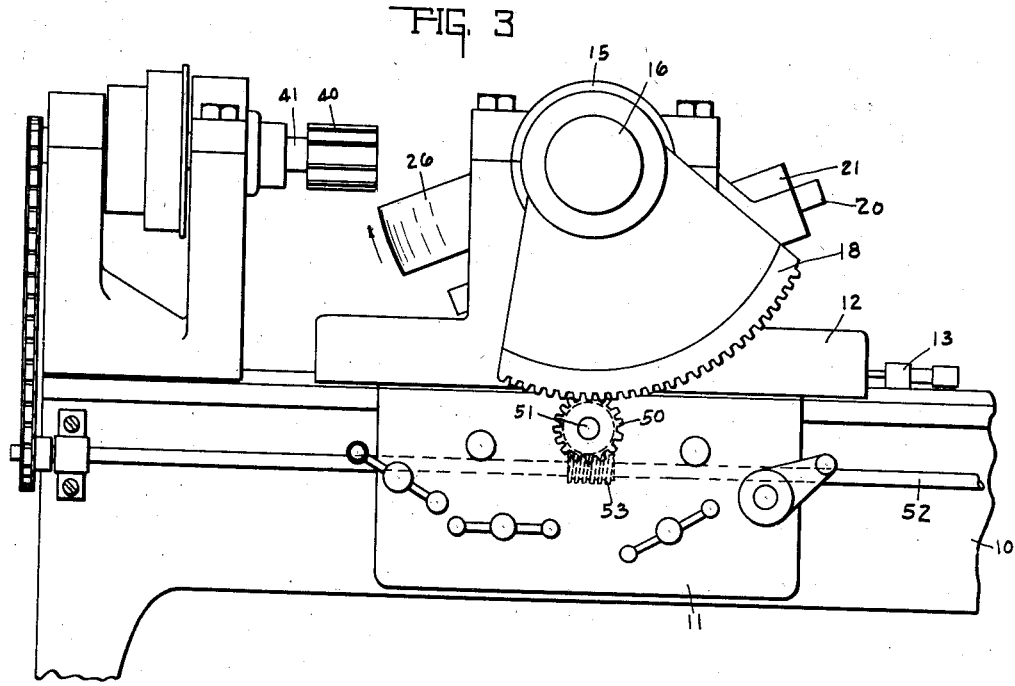
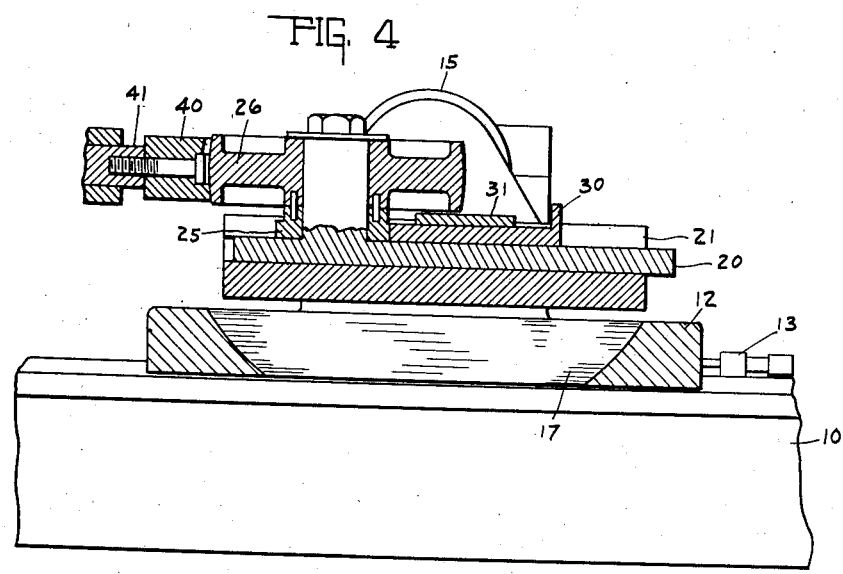
INVENTOR.
LUCIAN W. BUGBEE.
BY
Lockwood & Lockwood
ATTORNEYS L. W. BUGBEE.
MACHINE FOR MAKING SPOTTING WHEELS FOR MANUFACTURING LENSES.
APPLICATION FILED FEB. 18, 1919.
1,333,383.
Patented Mar. 9, 1920.
3 SHEETS—SHEET 3.
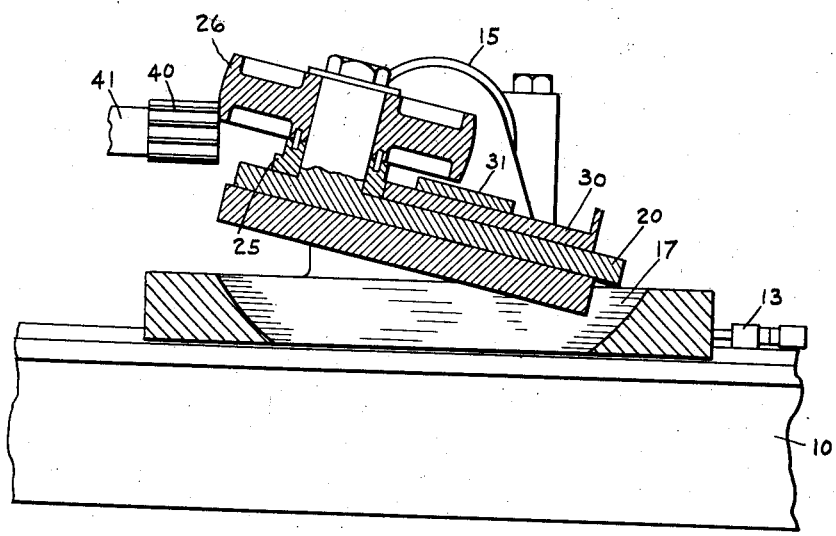
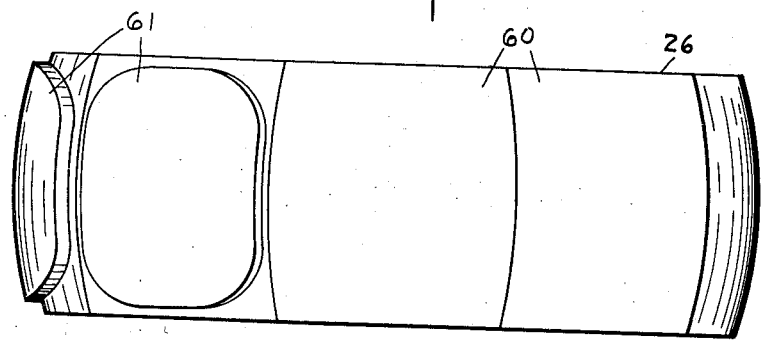
INVENTOR.
LUCIAN W. BUGBEE
BY
ATTORNEYS

UNITED STATES PATENT OFFICE.

LUCIAN W. BUGBEE, OF INDIANAPOLIS, INDIANA, ASSIGNOR TO ONEPIECE BIFOCAL LENS COMPANY, OF INDIANAPOLIS, INDIANA, A CORPORATION.

MACHINE FOR MAKING SPOTTING-WHEELS FOR MANUFACTURING LENSES.

1,333,383.

Specification of Letters Patent.

Patented Mar. 9, 1920.

Application filed February 18, 1919. Serial No. 277,875.

*To all whom it may concern:*

Be it known that I, LUCIAN W. BUGBEE, a citizen of the United States, and a resident of Indianapolis, county of Marion, and State of Indiana, have invented a certain new and useful Machine for Making Spotting-Wheels for Manufacturing Lenses; and I do hereby declare that the following is a full, clear, and exact description thereof, reference being had to the accompanying drawings, in which like numerals refer to like parts.

The object of this invention is to make a spotting wheel for mounting lens blanks while being ground, polished, or otherwise surfaced.

The novel character of the spotting wheel resides in the formation of the spots or seats for lens blanks being cut in the metal surface of the periphery of the wheel and also in being formed substantially rectangular. Heretofore spotting wheels have been used with a relatively unfinished peripheral surface upon which a relatively thick layer of pitch was placed and then the spots or seats for the lens blanks were impressed or formed in the pitch, and not in the metal wheel. The result was that there was difficulty in making the seats true, balanced and equidistant from the center of the wheel. The seat was often so formed that it tipped the lens blank so that one edge of it would be nearer the center of the wheel than the opposite edge. The result was that when the lenses were ground, instead of being uniform in thickness, they would vary in thickness relative to each other, and portions of the surfaces of the same lens would vary in thickness. Furthermore in grinding and polishing the lens blanks, the friction would cause sufficient heat to warm the pitch and make it so soft that the lens blanks would be dislocated. For this reason, it was impossible to use more than one finishing tool or element.

With the spotting wheel made by the mechanism herein shown, the spots are formed or cut in the surface of the metal wheel and so that the finished inner surfaces of lens blanks can be mounted directly on and in contact with such metal seats and, therefore, always be absolutely truly mounted. For this reason they will always be ground to uniform thickness and the lens does not become dislocated because the heat generated in grinding or polishing the lenses is taken up by the metal wheel, since lenses are in contact with it. The result is that the pitch does not become soft and a plurality of polishing tools or elements may be simultaneously employed.

Another feature of the machine herein is that it rocks the wheel while a spot on the periphery thereof is being formed by a rotary grinder so that the constant shifting of the wheel or work enables the grinder to more effectually cut the seat in the wheel than if the wheel and cutter were both stationary while the cutter rotated. Also a substantially rectangular lens blank seat is provided and that enables the lens blanks to almost abut against each other peripherally of the wheel so as to make a relatively continuous surface, and the lateral edges of the series of blanks are in alinement so as to facilitate the grinding and particularly the polishing of the wheel.

The full nature of the invention will be understood from the accompanying drawings and the following description and claims.

In the drawings, Figure 1 is a plan view of the main portion of a machine for forming the spotting wheel, said spotting wheel being indicated by a dotted line, and the driving means of the machine being omitted. Fig. 2 is a front elevation thereof with the spotting wheel in elevation, parts of the machine being omitted and parts being broken away. Fig. 3 is a side elevation of means for driving the cutter and tilting or feeding the wheel. Fig. 4 is a vertical section on the line 4—4 of Fig. 1, with the spotting wheel shown in one position of treatment. Fig. 5 is the same with the spotting wheel in another position. Fig. 6 is a plan view of about one-half of the spotting wheel with lens blanks thereon.

The machine herein shown has a bed 10, an apron 11 and a table 12 slidable on the bed by adjustable means. This table carries two upright bearings 15 in which stub shafts 16 are mounted, which are secured to a rocking frame 17 located between the bearings 15 so as to be rocked to and fro by a segment of a wheel 18, secured on one of the stub shafts 16.

Upon the rocking frame 17 there is a sliding plate 20 held in place by the plates 21 and bolts 22 so as to slide longitudinally of the machine. This plate carries an upwardly extending turret 25 on which a spotting wheel 26 is mounted tightly in a horizontal position. The turret 25 is rotatable and has in its periphery a number of notches 27, one for each spot 60 desired to be cut on the wheel. There are shown herein eight of said notches. The end of a plunger rod 30 engages one of said notches, when the turret is adjusted, and holds the turret from displacement while the machine is operating. The rod 30 extends and operates through a frame 31 secured on a plate 20.

A rotary cutter 40 is mounted on a horizontal cutter shaft 41 and arranged so as to extend radially of the spotting wheel 26. The outer or cutting end of the cutter 40 is concave, in the form shown, so as to cut a double curved seat in the spotting wheel, that is, with its equatorial curvature and meridianal curvature alike. However, the invention is not limited to the form of the cutting face of the cutter, as the surface of the lens blank seat cut in the periphery of the spotting wheel may be varied. In the use of this invention so far, the curvatures of the spots cut have been substantially six diopters and, therefore, the cutting face of the cutter would be substantially the same.

While the cutter 40 rotates, the spotting wheel 26 being cut is very slowly rocked vertically by the segment 18 which has peripheral teeth and gears with a gear 50 on a shaft 51. The shaft 51 is driven by a worm 53 and worm wheel mechanism behind the apron 11, the worm being on a feed rod 52 which is driven by gearing at the left-hand end of the machine which is connected operatively with the cutter shaft 41 so that they are simultaneously driven.

In operation, when the machine is started, the cutter 40 is constantly rotated and the spotting wheel, arranged in an inclined position, is moved up to the cutter so that as the spotting wheel rocks upward, a spot will be cut in the periphery thereof. Then the turret is turned and reset for cutting the next spot and the operation repeated as before, when another spot will be cut therein. Every time the machine goes through one operation, it cuts one spot. When the wheel is finished, it will have eight substantially rectangular spots thereon whose curvatures are absolutely uniform and equidistant from the center of the wheel and if lens blanks 61 are secured directly on the metal surface of said spots so that the glass will lie direct against the metal surface, the blanks will always be located on the spotting wheel in absolute accuracy.

The meridianal curvature of the spot is determined by the arc suspended from the axis of the rocking frame 17, and the equatorial curvature thereof by the diameter of the face of the cutter and the arc suspended from the center of the wheel.

The mechanism shown in the drawings herein is merely for the purpose of illustrating the nature of the invention, and the invention is not limited to said particular mechanism, as it is immaterial whether the carriage supporting the spotting wheel rocks, or the cutter rocks, or both. The only requirement is that the spots for the lens blanks be cut across the peripheral surface of the spotting wheel.

The invention claimed is:

1. A machine for forming lens blank seats on a spotting wheel including a rotary cutter, means for supporting a spotting wheel in position for the cutter to cut across the peripheral surface thereof, and means for oscillating one of said members so as to cause a relative transverse movement of the periphery of the spotting wheel and the cutter.

2. A machine for forming lens blank seats on a spotting wheel including a rotary cutter in fixed position while it operates, and oscillatory means for supporting a spotting wheel in position for its periphery to be rocked in a plane parallel with its axis and across the face of the cutter so that the latter will cut across the peripheral surface of the wheel.

3. A machine for forming lens blank seats on a spotting wheel including a rotary cutter in fixed position while it operates, oscillatory means for supporting a spotting wheel in position to be rocked across the face of the cutter so that the latter will cut across the peripheral surface of the wheel, and a single means for rotating said cutter and rocking said spotting wheel support.

4. A machine for forming lens blank seats on a spotting wheel including a rotary cutter, rotatable means for holding said spotting wheel so its surface will be presented to and cut by said cutter, means for oscillating one of said means with relation to the other so that the cutter will cut a spot transversely of the peripheral surface of the wheel, and means for giving said spotting wheel holding means a step by step rotary movement so as to bring successive sections of the peripheral surface of the wheel to the cutting face of the cutter, whereby a series of spots will be cut on the spotting wheel.

5. A machine for forming lens blank seats on a spotting wheel including a rotary cutter, a rotatable turret with its axis extending transversely of the axis of the cutter and adapted to receive and hold said spotting wheel so as to bring its peripheral surface against the face of the cutter, said turret having a row of equidistant notches around the same, one for each spot to be cut on the wheel, means for causing one of said parts to oscillate with reference to the other so that the cutter will cut a spot transversely across the peripheral surface of the wheel carried by said turret, and receiving means for engaging one of said notches in the turret for locking it in position while the corresponding spot is being cut.

In witness whereof, I have hereunto affixed my signature.

LUCIAN W. BUGBEE.